Aug. 8, 1939.                S. H. AYERS ET AL                2,168,506
                      PROCESS FOR TREATING FOOD PRODUCTS
                         Filed Jan. 19, 1938          2 Sheets-Sheet 1
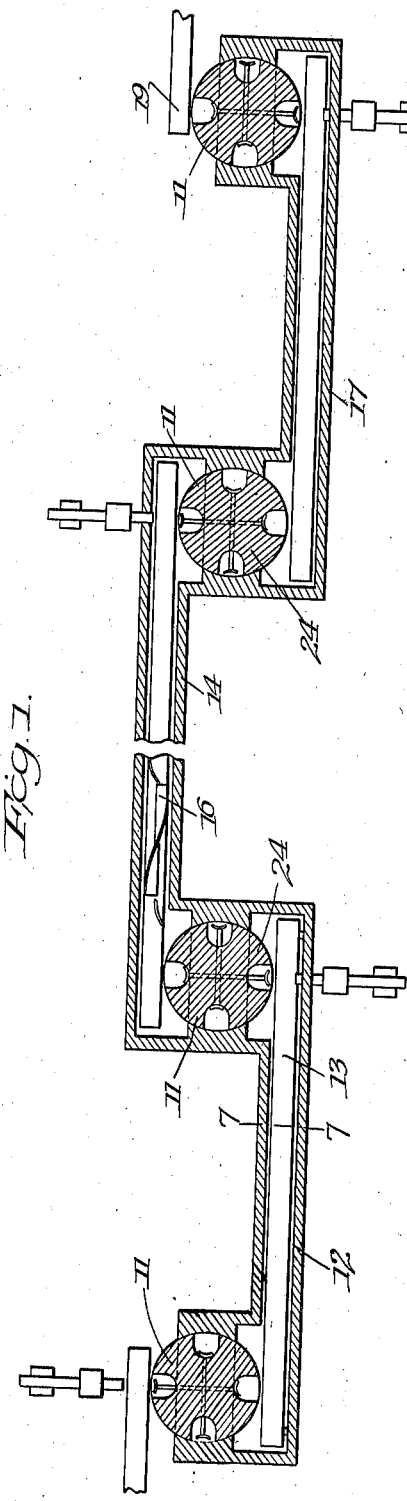
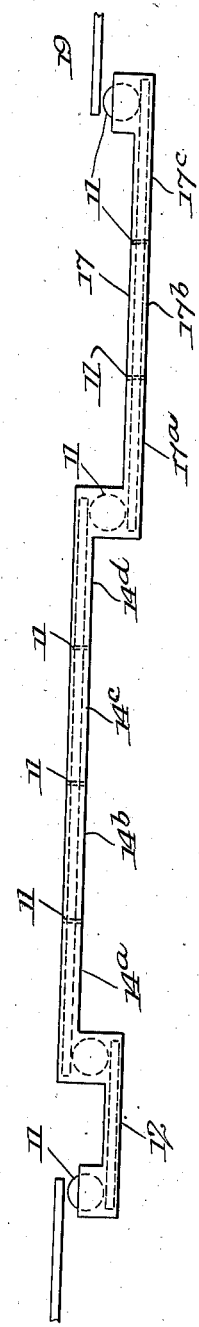
Inventors
Samuel H. Ayers.
Charles W. Lang.
By Cushman Darby & Cushman
Attorneys

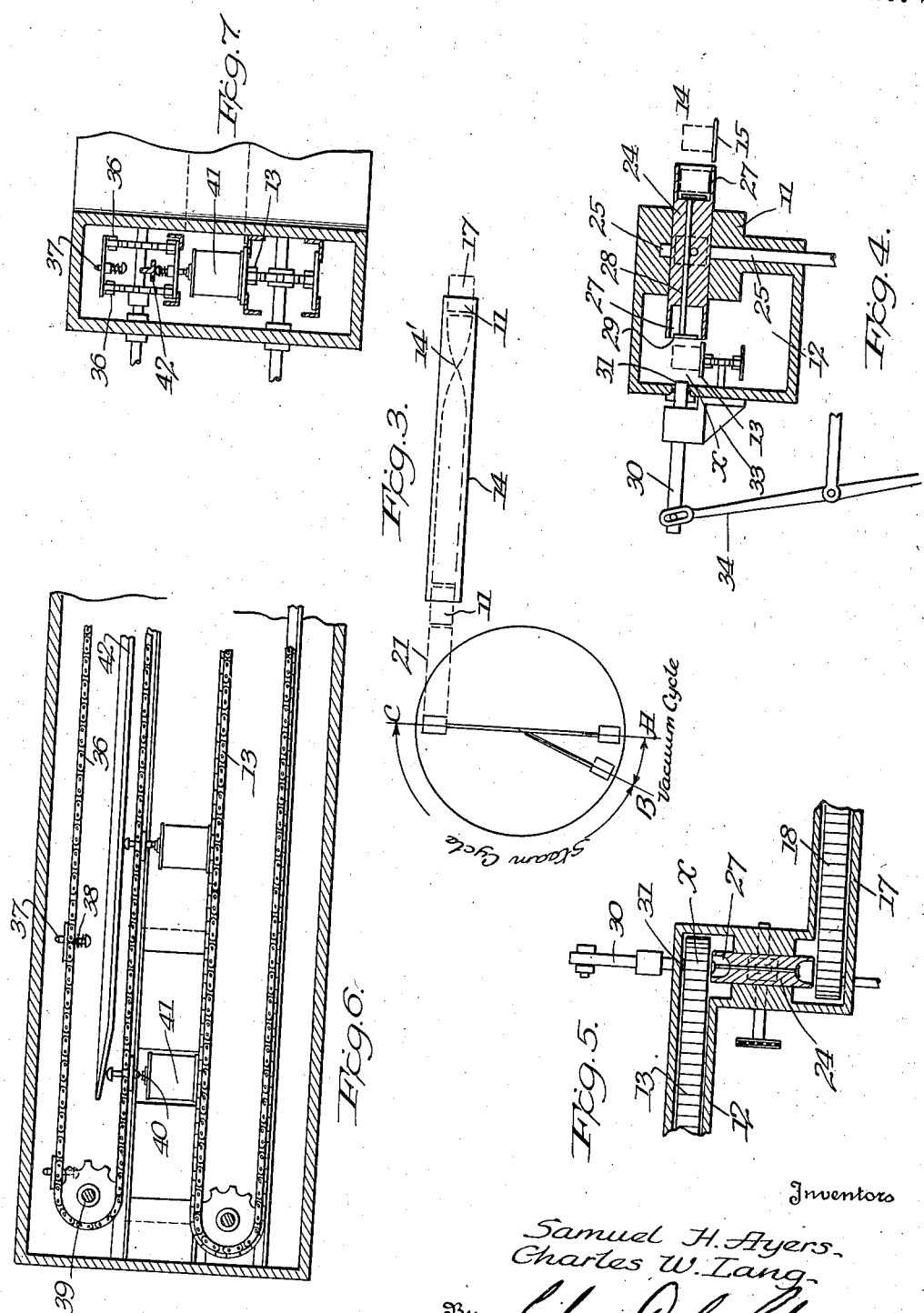

Patented Aug. 8, 1939

2,168,506

UNITED STATES PATENT OFFICE 2,168,506

PROCESS FOR TREATING FOOD PRODUCTS

Samuel Henry Ayers and Charles W. Lang, Philadelphia, Pa., assignors to Crown Can Company, a corporation of Pennsylvania Application January 19, 1938, Serial No. 185,778

11 Claims. (Cl. 99—182)

The present invention relates to a process and apparatus for the treating of food products in general and particularly packaged products which have to be commercially sterilized.

The invention is an improvement upon the processes described in the patents to Ayers and Lang, Reissue 20,578, December 14, 1937, and 2,054,066, dated September 15, 1936, and the apparatus set forth in United States patents to Mills, 2,054,093 and 2,054,192, September 15, 1936.

Briefly stated, in the carrying out of the processing of food products in general which require commercial sterilization, in accordance with the aforementioned patents, the product is disposed in a container, for example, of the type shown and described in the United States patent to Fenn, 1,728,533, September 17, 1929, and first subjected to a vacuum treatment followed by sterilization preferably with steam which is injected into the container and mixes with the contents. The process and apparatus are suitable for the treatment of a large number of packaged products, but there are frequently cases where a longer sterilization treatment is necessary. Under such latter circumstances, it would be necessary to either slow up the heating cycle to a point which would interfere with required rapidity for commercial operations or to build a machine of very substantial size which would likewise be disadvantageous. If it were attempted to take care of this condition by increasing the temperature of the steam, a pressure would build up within the container such as might unduly strain the ends of the metal can or otherwise distort the same, and such extremely high temperatures also might interfere with the satisfactory processing by damaging the contents.

It is the primary object of the present invention to overcome these difficulties and provide a thoroughly feasible commercially adaptable process and apparatus.

Another object of the invention is to provide a process which is rapid and continuous, and which allows very nice control to be exercised. In this manner, a continuous line of packages may be uniformly processed, suitable adjustments being simply made to take care of variations in the size of container and nature of contents.

A further object is to provide a continuous process and apparatus which affords a holding period for prolonging sterilization treatment of the contents at predetermined temperatures for a sufficient length of time to assure satisfactory commercial sterilizing. In this connection, present processing methods and apparatus do not make provision for such a holding period and the contents, when the containers are removed from the processing machine, suffer a rapid drop in temperature so that a holding period may only be had at a constantly decreasing temperature which is inadequate, or by a reheating which is not desirable. With the present process and apparatus, the vacuumizing and processing including subjecting the contents to a desired sterilizing and holding period is carried out in a single machine, and during one passage of the can through the machine.

An additional object of the invention is to carry out the processing in such a manner that during the holding period the external pressure upon the can so compensates for the pressure built up within the can as to guard against the possibility of unduly straining either the walls or the ends of the container.

It is recognized that sterilizing at high temperatures necessarily builds up a high pressure within the container and it is a further aim of the invention to provide means whereby after the sterilizing treatment and the container valves are closed, this pressure is reduced to a suitable point before the cans are delivered from the machine. This step of the process is likewise continuous with the vacuumizing and sterilizing operations and is conducted in such a manner that when the containers are introduced to atmospheric pressure, the differential between the internal pressure and the external atmospheric pressure is insufficient to strain the can walls or ends. That is, following the heat treatment, the cans with their valves closed are delivered into a chamber where they are subjected to a reduced pressure and temperature for a time period such that the pressure within the containers decreases to a point where they may be safely introduced to the atmosphere without fear of distortion, and the external pressure in the chamber is sufficient to compensate for the internal pressure at all times and avoids straining of the container body and ends.

A further object of the invention is to provide a process and apparatus which may be associated with and made continuous with the usual process and apparatus of the aforementioned patents whenever a prolonged holding or sterilizing period is desired, and an apparatus which may be readily detached for the processing of products which are suitably sterilized in the normal cycle of operations.

In the accompanying drawings, we have illustrated a preferred manner of carrying out the process, but it is to be understood that the process may be modified and the apparatus subjected to considerable change without departing from the spirit of the present invention.

Referring to the drawings,

Figure 1 is a diagrammatic view of one form of apparatus for carrying out the invention;

Figure 2 is a diagrammatic view showing another form of the invention;

Figure 3 is a partial diagrammatic view of a modification;

Figure 4 is a detailed sectional view showing one type of fluid tight transfer mechanism used for transferring containers, in the apparatus of Figures 1 to 3;

Figure 5 is a top view of a mechanism for inverting the containers and constitutes a modification;

Figure 6 is a side elevation showing the conveyor in the vacuumizing chamber and associated means for maintaining the valves in the can ends open during the vacuumizing step; and Figure 7 is a sectional view taken on the line 7—7 of Figure 1.

Referring to Figure 1, we have illustrated diagrammatically one form of apparatus for carrying out the process of this invention. The numeral 10 indicates a suitable conveyor upon which preheated food products in containers having the Fenn valve ends double seamed on them are delivered to a suitable transfer means 11 for introduction to the initial step of the process. At this point the valve in the Fenn end is open. The transfer means which is fluid tight and will be later specifically described automatically delivers the containers into a vacuum chamber 12 where they are carried by a suitable conveyor 13 through the length of the vacuum chamber. In this chamber means are provided for maintaining the valve ends open during the vacuumizing operation. Such means are illustrated in Figures 6 and 7, and will be described in detail hereafter. A vacuum of twelve to twenty-nine inches is representative of that required for accomplishing the desired degassing of the contents. The time period of the vacuum treatment and the degree of degassing, may, of course, be controlled by the speed of the conveyor 13 as well as the degree of vacuum present and the length of the chamber. At the end of the vacuum treatment a similar transfer means 11 is employed to transfer the vacuumized containers to a pressure chamber 14. While passing through this transfer means the valves remain open.

In this pressure chamber 14, the contents are subjected to steam at a suitable pressure to promote commercial sterilization and the time period is again regulated by the speed of the conveyor 15 upon which the cans are delivered from the transfer means and by which they are passed through the pressure chamber. In this connection, the cans enter chamber 14 in an upright position, i. e., with the valve ends up, but are inverted by any suitable means 16 such as a screw member 14' to have the valve ends down during a substantial portion of their travel, whereby thorough diffusion and penetration of the steam into the contents is afforded, and the cans may or may not be returned to normal position with the valve ends up depending on the operating conditions desired.

By reason of the external steam pressure, the valve ends are held open during the processing and the presence of this pressure about the container ends and walls serves to compensate for any excess pressures which may be built up within the container. It will be observed that in the present case the time period and temperature are controllable, so that the invention is universally applicable to processing operations which do or do not require an additional holding or sterilizing treatment and that prolonged high sterilization temperatures, e. g., 288° F. are possible without fear of distorting the containers. Furthermore, the control afforded can be practiced with such nicety that no ill effects are produced upon the contents.

It is to be noted that the steam in the high pressure chamber, while exerting its greatest effect in heating the contents of the can by condensation as it is injected through the valve, also has a secondary advantageous heating effect insofar as the can is in an atmosphere of high pressure, high temperature steam. That is, since the steam is being injected into the can while in an atmosphere of steam, heat is taken up by the can and it assists in the heating of the container as distinguished from treatment in accordance with the aforesaid patents where there is no steam outside of the container and some heat is necessarily lost to the atmosphere.

From the pressure chamber 14 the cans are carried by similar transfer means 11 to a reduced pressure chamber 17, the valves closing during the transfer because of the presence of a greater internal than external pressure. In this pressure chamber, the external pressure is such that any internal strain upon the container is satisfactorily compensated for or balanced and the temperature is such that the pressure within the container is progressively reduced as the containers travel through the chamber on the conveyor 18 upon which they are deposited by the transfer means. At the opposite end of the chamber a similar transfer means 11 is provided for transferring the processed containers to the atmosphere and by reason of the reduced pressure treatment, the differential between the internal and external pressures is such, the internal pressure being, for example, about five to twenty pounds, that upon introduction to atmospheric pressure, there is no strain upon the container such as would produce distortion. It is only necessary now to crimp the valves upon the container ends, and, of course, subject the cans to any further treatment desired, such as cooling, labeling, etc.

It is possible to effect accurate control in the present process and apparatus whereby different products in a wide variety of size containers may be successfully and uniformly treated. For instance, this control may be exercised in the case of the vacuum chamber, by regulating the degree of vacuum and/or the speed of travel of the containers, and in the pressure and reduced pressure chambers, the speed of travel of the containers and the temperatures and pressures may be individually controlled. In any event, the cans are rapidly and continuously passed into the apparatus from the conveyor 10 and successively and continuously (1) undergo vacuumizing, (2) commercial sterilization including a prolonged holding period at high temperatures, and (3) have the temperature and pressure within the cans reduced so that they are delivered completely processed and commercially sterilized to the atmosphere without danger of having the container distorted.

Instead of having a single steam chamber or high pressure chamber 14, this may be divided into several sealed divisions or sections in which the temperatures may be progressively increased from the initial delivery end, or progressively decreased therefrom, as the cans travel through the chamber. In a similar manner, the reduced pressure chamber 17 may be provided with sections of progressively decreasing temperature and pressure from the initial delivery end to the opposite end.

It will be appreciated that by means of the most simple type of instruments, an operator is enabled to uniformly process a particular batch of food products and the entire operation is automatic and continuous.

As one example of processing in accordance with the present invention and referring to Figure 1 a plurality of #2 size cans of corn are first preheated with the tops off to 180° F., and thereafter the tops each including a Fenn valve are placed in position. The containers are then carried on the conveyor 10 and automatically transferred into the vacuum chamber 12 by the transfer means 11. The valves are held open by suitable means as shown in Figures 6 and 7 and the vacuum is maintained at about 12 inches. The conveyor 13 is moved through the vacuum chamber at a speed to exclude an amount of air and gases from the containers as will not cause the contents to boil at the temperature of the contents and the reduced pressure in the chamber. The containers are carried through the vacuum chamber in upright position with the valve ends up and are then automatically and continuously introduced by the fluid tight transfer means into the high pressure chamber 14 with the valve ends up. A steam pressure of, for example, substantially 40 pounds and a temperature of about 287° F. is maintained in the chamber 14. This pressure will open the valves and the containers are inverted by a screw member 14' or any other suitable means and held in inverted position with the valve ends down for about one minute and then turned valve side up. The rate of travel of the conveyor is controlled so that the cans are heated for any length of time required to promote the desired commercial sterilization. As explained, the temperature and speed of travel through the chamber may be controlled so as to afford a holding period where necessary. Since the valve is open, the internal pressure in the can and the external pressure about the can are substantially compensating so that no undue strain occurs upon the can walls or ends such as would distort the container notwithstanding that high temperatures and pressures and a sustained period of treatment are employed.

From the high pressure chamber 14, the containers with the valve ends up are automatically and continuously introduced by the transfer means 11 into the reduced pressure chamber 17 upon the conveyor 18. In this chamber, a pressure of 15 to 20 pounds is maintained by means of air, steam or water vapor or air and water vapor, water or any other cooling fluid. As will be appreciated, the temperature of the cans and contents is reduced and this is accompanied by a reduction in internal pressure. The external pressure about the cans is insufficient to unseat the valves, but is, however, ample to compensate for any internal pressures within the container so as to prevent distortion of the can bodies and ends as the container travels through the chamber. This treatment in the reduced pressure chamber by controlling the temperature and pressure and speed of conveyor 18 is such that the containers are automatically introduced to the atmosphere by the transfer means 11 at a temperature of about 250° F. and an internal pressure of substantially 20 pounds, which pressure differential is not objectionable from the standpoint of straining the containers. The containers are deposited by the final transfer means upon the conveyor 19 and thereafter, the containers and contents may be suitably cooled and the cans labeled in the usual manner.

Referring to Figure 2, where a multiplicity of pressure chambers or sections 14a, 14b, 14c and 14d each sealed by an automatic transfer means 11 are used, the cans are introduced into the first section having a steam pressure of about 15 to 20 pounds, and a temperature of approximately 250° to 259° F. and thereafter are automatically and continuously introduced into the second chamber wherein the pressure is between about 35 and 45 pounds and the temperature between about 280° and 292° F. As many sections or chambers may be used, for example, four, but two are usually sufficient. The temperatures and pressures in the respective sections may progressively increase or decrease as the containers travel through the apparatus. Suitable inverting means such as a screw 14' may be positioned in one or more of the sections. Where four pressure sections are used, the first and last sections 14a and 14d may have reduced pressures and temperatures, e. g., 15 to 20 pounds and 250 to 259° F., while the intermediate sections 14b and 14c will have a temperature of 280 to 287° F. and a pressure of 35 to 40 pounds.

Where a plurality of reduced pressure chambers or sections 17a, 17b and 17c each sealed by automatic transfer means 11 are used, the pressure in the first chamber will be around 30 pounds and in the second chamber around 15 pounds. Again as many reduced pressure chambers or sections may be employed as desired, but two are usually sufficient. The can is removed from the pressure chamber at a temperature of about 250° F. and may have an internal pressure of substantially 20 pounds.

It is to be observed that the present process is continuous and automatic, and enables a batch of any particular food product to be uniformly processed in the containers and under control conditions free from complicated adjustments. Furthermore, the process and apparatus is adaptable to any food product and any size of container. In this connection, also, only very simple adjustments are necessary, for example, control of the speed of the conveyors and the control of the temperatures and pressures in the respective pressure chambers, in order to adapt the process and apparatus to process any desired food product.

It is, of course, understood that in every case the transfer means seal each section or chamber from the other.

Further, it will be appreciated that the invention constitutes a marked improvement over previous practice, for example, of canning corn, where it was customary to preheat the corn to about 140° F. in the containers and then seal the cans and heat the same to bring to a temperature of 240° F. and hold at that temperature for fifty minutes. Furthermore, the process and apparatus constitute an advantageous improvement over the practice of the aforesaid patents in that it is possible to use practically any temperature for commercial sterilization for any length of time without fear of straining the containers, and at the same time afford a rapid, continuous and uniform processing.

Modification

Referring to Figure 3, we have illustrated diagrammatically a modified process in accordance with this invention, and wherein the vacuum chamber 12 is omitted. This process and the apparatus associated therewith are for use in continuation of the process and apparatus of the aforesaid patents to provide a holding period at high enough temperatures to obtain commercial sterilization without straining the container. The numeral 20 indicates a "Stero-vac" machine in accordance with the aforesaid patents. In the first step of the invention, a Fenn type of can with valve end and having the contents therein preheated and ready for processing is placed on a header in position A on the "Stero-vac" machine and moved from A to C during which cycle the can is inverted. As the can is turned in a vertical plane it reaches a high vacuum in its travel from A to B. At position B, the vacuum is cut off and steam is injected through the rest of the cycle to position C. Sufficient steam is injected into the can to break up the vacuum, partially sterilize the contents, and build up enough pressure in the container to lightly seat the valve disc. At point C, the can is removed from the header and in the same inverted position (valve down) is carried by the conveyor 21 and automatically transferred by means 11 into the high pressure steam chamber 14 similar to that described in connection with Figures 1 and 2 for completing the sterilization. The can is inverted by any suitable means such as screw 14' in the chamber 14 to bring its valve end up, and is automatically discharged therefrom into a reduced pressure chamber 17 and finally to the atmosphere in the manner previously described. This process is entirely automatic and continuous as previously explained, being a simple means of adapting the process and apparatus to existing "Stero-vac" equipment to afford a prolonged sterilization treatment at high temperatures without unduly straining the container walls and ends.

It will be appreciated, that the treatment in the chambers 14 and 17 in accordance with this modification is substantially similar with that previously described in connection with Figures 1 and 2 and therefore further detailed explanation is unnecessary.

Transfer means 11

Referring to Figure 4, transfer means 11 are shown in detail, being in the form of a valve or table of such construction as to provide a seal for the various chambers and sections to prevent loss of pressure. Likewise, these valves may be insulative to prevent heat transfer between the chambers or sections.

Referring to Figure 4, the transfer table or valve 11 is shown in position between the chambers 12 and 14 for purposes of illustration, the structure and operation being the same in all cases. This transfer means includes a horizontally disposed cylindrical member 24 having studs 25 fixed to its upper and lower surfaces and by which it is mounted for rotation in the top and bottom walls of a passage between the chambers. The cylindrical member is provided in its periphery with a plurality of pockets 27 to receive vertically extending cans of various sizes and are preferably arranged in diametrically opposed relation, as many diametrically opposed pockets or pairs being employed as desired. In the present instance, two pairs of pockets in diametrically opposed relation are illustrated.

Slidable horizontally in the cylindrical member and extending through the vertical axis thereof are rods or stems 28 having enlarged ends or pusher feet 29, one foot of each stem being disposed to reciprocate in one pocket and the other in the diametrically opposite pocket 27. The cylindrical member 24 is adapted to rotate in a clockwise direction so as to bring a pocket successively in alignment with a point X on the respective conveyors (in the present instance the conveyor 13) to which point a line of cans is continuously carried by the conveyors. At this point X, the cans are automatically moved from the conveyor into the aligned pocket 27 by means of an intermittently reciprocated arm 30 carrying a pusher end 31 which engages a can and disposes it in the aligned pocket. At the same time, the stem 28 associated with this pocket and the diametrically opposed pocket is caused to slide in the cylindrical member 24 because of the engagement of the can with the adjacent foot 29 moving the same inwardly of the pocket, and simultaneously the foot 29 on the opposite end of the stem will be moved outwardly to eject a container from the diametrically opposed pocket 27 onto the conveyor 15 in the high pressure chamber 14.

The arm 30 is slidably carried in a bracket 33 mounted on the wall of the chamber 12 and is connected to a lever 34 associated with a suitable operating mechanism for reciprocating the arm 30. This mechanism is preferably so connected up with the cylinder 24 that the latter is intermittently rotated in timed relation a proper distance to bring a pocket 27 successively in alignment with the pusher end 31 of the arm 30, during the continuous operation of the apparatus. Likewise, the conveyors 13 and 15 may be similarly intermittently actuated in timed relation although it is preferred to have the belts moved continuously.

It is to be noted that the cylinder 24 has a snug rotary fit with the walls of the passage between the chambers 12 and 14 as shown at 35 in Figure 1 so that as far as possible no pressure can leak from the chambers past the transfer table. At all times, one chordal area of the table or cylinder 24 will extend outwardly beyond the confines of the passage between the chambers in exposed relation to the feeding conveyor (in the present case, conveyor 13 in chamber 12), while a diametrically opposite chordal area will extend inwardly free of the walls of the passage and into the chamber 14 in proximity to the conveyor 15. Also, with the arm 30 and table 24 moving in timed relation intermittently as above explained to successively bring a pocket 27 opposite the pusher end 31, it will be noted that in each such relation of the parts, one of the feet 29 will be projected outwardly while the other foot on the stem will be moved back within the opposite pocket 27. In this manner, the containers are continuously fed from the initial feeding conveyors 10 or 21 to the respective chambers, to and from the chambers or sections, and to the atmosphere. As will be appreciated, the operations are entirely automatic and a container is automatically ejected from one pocket 27 simultaneously with the positioning of a container in another or opposite pocket.

Modified inverting mechanism

Referring to Figure 5, an inverting transfer mechanism is shown which may be employed instead of a worm or screw 14' for simultaneously inverting the containers while accomplishing the transferring operation which is otherwise performed by transfer means 11. A construction similar to that shown in Figure 4 is found advantageous, the only substantial changes necessary being (1) the location of the cylinder 24 in a vertical plane whereas the transfer table previously described has the cylinder positioned in a horizontal plane and (2) changing longitudinal direction of the pockets 27. The containers are delivered from the conveyors to the cylinders 24 as previously described and are deposited upon the conveyors in inverted position with the valve ends up or down as the case may be. The inverting transfer mechanism will act as a seal and may be insulative in the manner previously set forth.

Means for automatically retaining valve ends open in vacuum chamber 12

Referring to Figure 6, there is mounted in the chamber 12 above the conveyor 13 a second conveyor 36 carrying a plurality of spring-pressed plungers 37. These plungers are normally pressed outwardly by means of the springs 38. The conveyor operates over suitable sprocket wheels 39 and at a speed such that one of the plungers 37 will engage the valve 40 of a can 41 carried on the conveyor 13. In other words, the plungers 37 are spaced apart a sufficient distance and are carried at a predetermined rate of speed so that a plunger will engage each can as delivered upon the conveyor 13 by the transfer means 11. Associated with the lower rung of the conveyor 36 is a cam track 42, which, as shown in Figure 6, acts to depress each plunger into engagement with a can valve 40 and maintain this engagement so that the valve is open substantially throughout its travel in the vacuum chamber 12. At the end of the chamber 12, the plungers are released by the cam track, and the vacuumized cans are transferred to the high pressure steam chamber.

The apparatus shown in Figures 1 and 2 is preferably composed of a plurality of independent chambers connected in sealed relation by any suitable means with the passageways between the chambers closed by the transfer means 11. In connection with the apparatus of Figure 3, the heating chamber 14 may be so disposed with relation to the "Stero-vac" machine that the containers are exposed to atmospheric conditions when released therefrom for only a negligible period of time.

The present invention very substantially increases the speed of processing over any present known or practiced methods and has the further advantage that it is capable of simple control to assure complete uniformity.

It is to be understood that in the heating and pressure chamber 14, the pressures will always be sufficient to maintain the Fenn valves open while in the reduced pressure chamber 17 it is preferred that the pressures be such as to maintain the valves closed.

In referring in the claims to "chambers", we mean either the construction shown in Figure 1 or the sectional structure described in connection with Figure 2.

In referring in the claims to "sterilizing", this term is intended to cover commercial sterilization. In this connection, it is to be understood also that the temperatures given and the pressures recited are purely representative in that the process and apparatus are operable with temperatures and pressures lower than those described as well as temperatures and pressures which are well above those mentioned. It must be appreciated, that the temperatures and pressures in any cases are dependent upon the products being treated and the processing requirements.

We have illustrated herein preferred and representative apparatus and processes, and it is to be understood that changes and modifications which come within the purview of the invention are considered to be comprehended within the scope of the appended claims.

While we have referred in this application to the treatment of corn, this is only for purposes of illustration since the invention is applicable for the treatment of food products in general. A partial list of the products which may be treated in accordance with this invention includes fruits and vegetables and their juices, dairy products and such foods as spaghetti, baked beans and soups, meat and marine products.

We claim:

1. In the art of processing foods in containers each having an end provided with a valve closable by pressure within the container, the steps of vacuumizing the container and contents, and then injecting steam into the container and contents at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented.

2. In the art of processing foods in containers each having an end provided with a valve closable by pressure within the container, the continuous steps of vacuumizing the container and contents, and then injecting steam into the container and contents, at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented.

3. In the art of processing foods in containers each having an end provided with a valve closable by pressure within the container, the steps of vacuumizing the container and contents, and then injecting steam into the container and contents at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented, and thereafter subjecting the container and contents to a reduced temperature whereby the pressure within the container decreases and simultaneously to a reduced pressure which is sufficient however to compensate for the internal pressure and for a time period such that the internal pressure is not sufficiently high when the container is exposed to atmospheric pressure to distort the container.

4. In the art of processing foods in containers each having an end provided with a valve closable by pressure within the container, the continuous steps of vacuumizing the container and contents, and then injecting steam into the container and contents, at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented, and thereafter subjecting the container and contents to a reduced temperature whereby the pressure within the container decreases and simultaneously to a reduced pressure which is sufficient however to compensate for the internal pressure and for a time period such that the internal pressure is not sufficiently high when the container is exposed to atmospheric pressure to distort the container.

5. In the art of processing foods in containers each having an end provided with a valve closable by pressure within the container, the steps of vacuumizing the container and contents, and then injecting steam into the container and contents at a temperature and for a time period sufficient to effect sterilization thereof and at a pressure to maintain the valve open, while maintaining an external pressure about the container so closely approximate to the internal pressure within the container that any pressure therein tending to strain the container is substantially compensated for, whereby undue strain upon the container is prevented.

6. In the art of processing foods in containers each having an end provided with a valve closable by pressure within the container, the continuous steps of vacuumizing the container and contents, and then injecting steam into the container and contents at such a high temperature and pressure and for a time period sufficient to effect sterilization thereof, and said steam treatment being sufficient to build up an internal pressure in the container capable of closing the valve and of substantially distorting the container, and maintaining an external pressure about the container so closely approximate to the internal pressure within the container that any pressure therein tending to strain the container is substantially compensated for, whereby undue strain upon the container is prevented.

7. In the art of processing foods in containers each having an end provided with a valve closable by pressure within the container, the continuous steps of vacuumizing the container and contents, and then injecting steam into the container and contents at such a high temperature and pressure and for a time period sufficient to effect sterilization thereof, and said steam treatment being sufficient to build up an internal pressure in the container capable of closing the valve and of substantially distorting the container, and maintaining an external pressure about the container and the valve as will force the valve to remain open and so closely approximate to the internal pressure within the container that any pressure therein tending to strain the container is substantially compensated for, whereby undue strain upon the container is prevented.

8. In the art of processing foods in containers each having an end provided with a valve closable by pressure within the container, the steps of vacuumizing the container and contents, and then injecting steam into the container and contents, at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented, and thereafter subjecting the container and contents to a reduced temperature whereby the pressure within the container decreases but is sufficient to hold the valve closed and simultaneously to a reduced pressure which is sufficient however to compensate for the internal pressure and for a time period such that the internal pressure is not sufficiently high when the container is exposed to atmospheric pressure to distort the container.

9. In the art of processing foods in containers each having an end provided with a valve closable by pressure within the container, the steps of injecting steam into the container and contents at a temperature and for a time period sufficient to effect sterilization thereof, causing the valve to close the container and maintaining an external pressure about the container so closely approximate to the internal pressure within the container that any pressure therein tending to strain the container is substantially compensated for, whereby undue strain upon the container is prevented.

10. In the art of processing foods in containers each having an end provided with a valve closable by pressure within the container, the steps of vacuumizing the container and contents, and then injecting steam into the container and contents at a temperature and for a time period sufficient to effect sterilization thereof, causing the valve to close the container and maintaining an external pressure about the container so closely approximate to the internal pressure within the container that any pressure therein tending to strain the container is substantially compensated for, whereby undue strain upon the container is prevented.

11. In the art of processing foods in containers each having an end provided with a valve closable by pressure within the container, the steps of injecting steam into the container and contents at a temperature and for a time period sufficient to effect sterilization thereof, while maintaining an external pressure about the container so closely approximate to the internal pressure within the container that any pressure therein tending to strain the container is substantially compensated for, whereby undue strain upon the container is prevented.

SAMUEL HENRY AYERS.
CHARLES W. LANG.